United States Patent [19]

Dean

[11] Patent Number: 4,464,971
[45] Date of Patent: Aug. 14, 1984

[54] MUSICAL EDUCATION DISPLAY APPARATUS

[76] Inventor: Leslie A. Dean, 3950 N. Lake Shore, Chicago, Ill. 60613

[21] Appl. No.: 314,376

[22] Filed: Oct. 23, 1981

Related U.S. Application Data

[63] Continuation-in-part of Ser. No. 141,042, Apr. 17, 1980, abandoned.

[51] Int. Cl.³ .................. G09B 15/02; G09B 15/04
[52] U.S. Cl. .................................. 84/471 R; 84/472
[58] Field of Search .............................. 84/470–476, 84/483, 485

[56] References Cited

U.S. PATENT DOCUMENTS

| | | | |
|---|---|---|---|
| 532,964 | 1/1895 | Ingraham | 84/471 R |
| 605,157 | 6/1898 | Wickersham | 84/473 |
| 772,216 | 10/1904 | Chisholm | 84/472 |
| 979,193 | 12/1910 | Nelson | 84/473 |
| 1,286,785 | 12/1918 | Robbins | 84/472 |
| 1,295,025 | 2/1919 | Gray | 84/473 |
| 2,072,511 | 3/1937 | Ross | 84/470 R |
| 2,327,907 | 8/1943 | Knox | 84/472 |
| 2,770,160 | 11/1956 | Ulvad | 84/471 R |
| 3,130,627 | 4/1964 | Aaron | 84/471 R |
| 3,483,786 | 12/1969 | Heninger et al. | 84/470 R |
| 3,530,758 | 9/1970 | Stillo | 84/471 R |

FOREIGN PATENT DOCUMENTS

| | | | |
|---|---|---|---|
| 1011261 | 6/1957 | Fed. Rep. of Germany | 84/470 R |
| 950904 | 2/1964 | United Kingdom | 84/483 R |
| 2028564 | 3/1980 | United Kingdom | 84/471 R |

*Primary Examiner*—Lawrence R. Franklin
*Attorney, Agent, or Firm*—Dick and Harris

[57] ABSTRACT

A musical education display apparatus for musical instruction or composition. A display board is utilized with staff indicia which, in turn, is capable of removably restraining and displaying a series of notation indicia as desired. A retention storage tray, transparent overlay appendages and various means for restraining the musical notation removably in place on the staff indicia attached to the display board are utilized to conveniently display such musical notation for educating and/or composing purposes. Through utilization of staff modification devices and teaching theory conversion apparata, the apparatus achieves modular flexibility for use in a variety of musical education techniques.

23 Claims, 9 Drawing Figures

U.S. Patent     Aug. 14, 1984     4,464,971
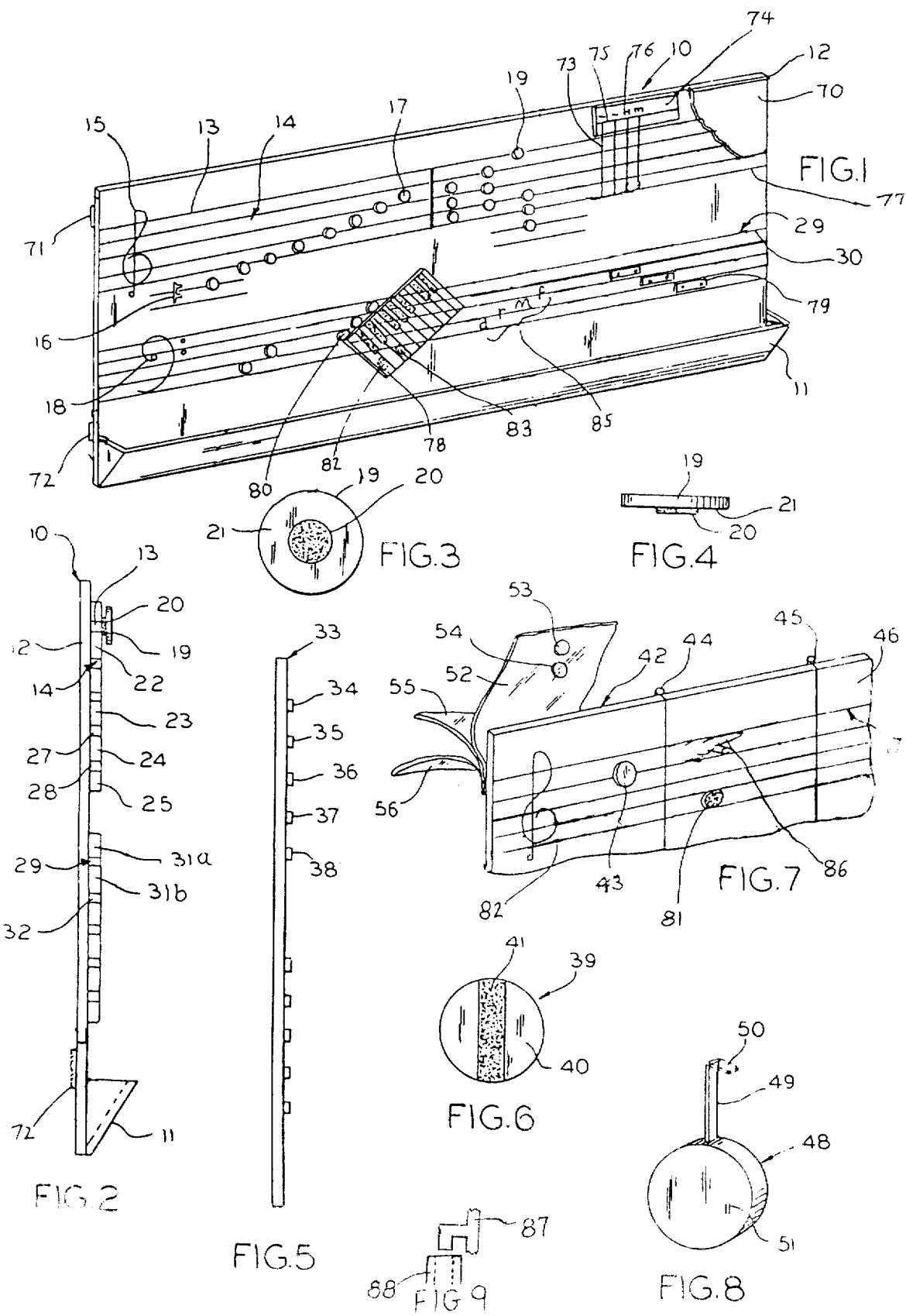

MUSICAL EDUCATION DISPLAY APPARATUS

BACKGROUND OF THE INVENTION

The present application is a Continuation-In-Part application of co-pending parent application Ser. No. 06/141,042 filed Apr. 17, 1980. Said parent application has now been abandoned.

The present invention relates in general to educational tools and display boards and, in particular, to a musical education apparatus for displaying musical notation towards musical instruction and/or composition.

While musical composition and instruction have most assuredly progressed over the last several centuries, the means for working with notes and other notation in composing and in training and instructing students (and especially children) has not changed to a significant degree.

Among the conventional means for displaying musical notation and for fixing such notation in a tangible form for the purposes of composing and instructing, the blackboard, the manuscript notebook and the paper easel sheet are among the three most widely used media for such musical expression. Associated with each of these three media are a host of problems including the waste and mess associated with nonreusable media such as large overlay sheets and musical notation manuscripts, as well as the chalk mess and illegibility and inconvenience in using blackboards. Additionally, while some blackboards and overlay easel sheets are prelined, many are not, which presents the problem of imposing staff lines on them for purposes of subsequently displaying musical notation. Additional expense must thus be encountered in the way of five-piece "chalkholders," etc. Indeed, an attempt to place staff lines on chalkboard or paper without such tools often results in merging staff lines and undesirable angles for the lines with resultant illegibility.

It is thus an object of the present invention to provide a musical education apparatus for displaying musical notation which is reusable and which permits convenient removability of notation to accommodate the "trial and error processes" of musical instruction and composition.

It is additionally an object of the present invention to provide such a display apparatus which is lightweight, inexpensive to manufacture and relatively portable.

It is also an object of the present invention to provide such a display apparatus which promotes tangible association between notes and sounds with manipulative notation pieces, especially for younger music students who can feel, manipulate and move such musical notation around as they learn with it.

It is further an object of the invention to provide such an educational apparatus which promotes the instruction of "sequential" musical theory through the use of readily removable and replaceable music notation together with overlay sheets which are capable of superimposing yet further supplementary notation in alignment with the staff lines of the display board itself.

It is additionally an object of the present invention to achieve the above-described educational objectives through the utilization of an apparatus which is inexpensive to use, which does not waste chalk or paper, which does not require messy erasing and which is further attractive and easy to read. In association with these objectives is the objective of providing legible musical notation and display which is not reliant on an individual's personal handwriting or artistic skill, while being clean, precise and fun to use, as well as elegantly simple in operation.

It is further an object of the present invention to describe a modular system for music education which is capable of providing substantial flexibility for use as desired by the music teacher and pupil. It is accordingly an object to provide devices for modifying substantial portions of the exposed staff to permit multi-theory educational techniques while at the same time converting exposed staffs to represent other instrumentation such as guitar fret indicia. Simultaneously, it is an object of the present invention to permit facilitated and convenient conversion of portions of the apparatus to accommodate different musical educational theories by accommodating Kodaly education indicia and a variety of tone generating and tone representative articles. Additionally, it is an object to provide such capabilities together with means for applying same to handicapped and particularly blind pupils.

These and other objects of the invention shall become apparent in light of the present specification.

SUMMARY OF THE INVENTION

The present invention comprises a musical education apparatus for displaying musical notation during the instruction of music, music theory and music composition. The apparatus itself comprises a substantially flat and planar display board which has at least one side which is exposed to a user. Staff indicia means are restrainably attached at their first side to the exposed side of the board. The staff indicia further has attachment means on its second side opposite to the first side for the removable attachment of musical notation indicia means thereto. Clef indicia means are operably attached to the staff indicia means and cooperate with the staff indicia to denote a particular clef for a particular staff.

The notation indicia means themselves comprise a plurality of musical notation indicia having a front and back side. On the back side of the musical notation indicia are indicia attachment means which cooperate with the indicia attachment means on the second side of the staff indicia, to permit the removable attachment of the notation indicia to the staff as desired. Further, the notation indicia include duration indicia as associated therewith, to denote the particular length of time with which each of the notation indicia is accorded musical significance.

In the preferred embodiment of the invention, the apparatus includes a storage tray for the retention, storage and organization of the musical notation indicia while the indicia are not in position on the staff indicia affixed to the display board itself.

The preferred embodiment of the invention further includes a series of transparent overlay sheets which are capable of being drawn over the exposed side of the display board. These transparent overlays have means for accepting supplementary notation indicia so as to be capable of displaying the additional musical notation in alignment with the staff indicia already appearing on the exposed portion of the display board when the transparent overlay is positioned over the exposed side of the display board. These one or more transparent overlays permit sequential construction and display of supplementary musical notation indicia in combination with the indicia already appearing on the display board as it shows through the transparent overlay. The supplemental notation, in one embodiment comprises thin plastic elements which adhere to the transparent overlay.

In one embodiment of the invention, the display board means comprises a display board of a substantially ferrous metal material capable of cooperating with magnets and the like for fixed, but removable attachment thereof. In this embodiment, one or more of the notation indicia means comprises substantially magnetic materials whereby the indicia attachment means on both the second side of the staff indicia, as well as the back side of the notation indicia comprise magnetic "attraction" thereby retaining the notation indicia in a removably affixed fashion to the staff indicia means and, in turn, the substantially metallic display board means. In either this magnetic embodiment or the Velcro embodiment discussed below, the clef indicia means is, preferably, also removably attachable to the staff indicia means which is, in turn, attached to the display board means. Alternatively, the staff indicia may be magnetic or of a metal material which attracts magnets.

In another embodiment of the invention, the staff indicia means includes a plurality of staff lines integrally formed with a plurality of co-planar staff spaces therebetween. This plurality of staff lines and spaces has indicia attachment means on their second sides comprising Velcro fastening material. The indicia attachment means on the back side of the notation indicia means comprises mated Velcro fastening material positioned to permit removable attachment of the notation indicia to the staff indicia as desired. In yet another embodiment of the invention, the staff indicia means comprises a plurality of staff lines independently attached to the display board in which each of the staff lines has, on their second side, indicia attachment means comprising Velcro fastening material. In equivalent fashion, the musical notation indicia attachment means comprise mated Velcro fastening material positioned on the respective back sides of the plurality of notation indicia to permit removable attachment of the notation indicia to the staff indicia.

The indicia attachment means in the "Velcro" embodiment contemplates the utilization (on the back side of the musical notation indicia) of a substantially circular mated Velcro patch which is capable of fastening with the mated Velcro elements on the second side of the staff indicia, already in position against the display board means.

In another embodiment, the indicia attachment means on the back side of the musical notation indicia comprises a substantially longitudinal striped Velcro patch which is equivalently capable of fastening with the mated Velcro elements on the second side of the staff indicia means exposed by the display board. This striped longitudinal patch preferably spans the diameter of the musical notation indicia so as to be capable of extending between proximate staff lines in the staff indicia means. Thus, the notation indicia would be restrainably affixed to the staff whether it was positioned between adjacent staff lines or centered on any one of the staff lines within the staff indicia means.

The invention further contemplates the utilization of several embodiments of duration indicia with which the notation indicia are respectively associated. In one embodiment, the duration indicia comprises a plurality of colors which are respectively assigned to each of the plurality of musical notation indicia to distinguish the length of musical duration from the other different colors assigned to other musical notation of different duration. In another embodiment, the duration indicia means comprises an integrated stem in one or more of the musical notation indicia means wherein the stem is capable of being extended or retracted so as to appear or not appear respectively for the specific purpose of changing, in a facilitated manner, the designation of duration which is associated with a particular musical notation indicia.

The preferred embodiment of the invention, calls for the hinging of the display board at locations substantially parallel to the vertical axis of the board for the purpose of facilitating the portability and transportation of the overall musical education apparatus.

In the preferred embodiment of the invention the board is made of a foam-core material covered with a continuous loop fabric having a staff indicia lines fabricated thereon. Such a construction permits notation indicia, staff modification and teaching conversion devices to be attached to the board where ever desired with maximum flexibility.

No matter which embodiment of the invention is utilized, staff modification means and teaching theory conversion means are a part of the apparatus. In one embodiment said modification means comprises staff cover devices which are removably attached to the display board to cover portions of staff lines to alternately add or camouflage musical information appearing on the board. In one embodiment the staff cover includes additional line members for converting the staff indicia into a guitar fret model. In this embodiment guitar fret strips are utilized for removable attachment to further portray guitar fret arrangement.

One embodiment of teaching conversion means comprises a keyboard overlay which is also removably attached to the staff indicia and further having a particular key size configuration so as to permit note-to-key alignment with notation indicia on the staff indicia means. In such an embodiment, transparent material is utilized with the keyboard overlay with a translucent portion of the keyboard representing the black keys of the keyboard, while permitting viewing of the staff lines and notation underneath the keyboard. In the preferred embodiment the piano keyboard overlay is constructed to the scale of an actual piano keyboard with seven-eighths inch white keys and one-half inch black keys. When the scale keyboard is utilized, the display board itself is of an appropriate size to permit key alignment with the notes while creating a teaching experience in the realistic recognizable size of an actual piano keyboard. In another embodiment a three dimensional opaque keyboard is used as a tactle aid for blind or beginning musical students.

In yet another embodiment, the conversion means comprises a plurality of standard resonating chime bells, with the board being of appropriate dimension to accomodate the placement of these 1½ inch wide bell chimes as if each were notation indicia themselves.

Alternatively Kodaly handsignal members of "sol-fa" syllable or abbreviations thereof, are utilized as conversion means to work with or substitute for the notation indicia.

In teaching blind pupils, textured surfaces are utilized on the staff and notation indicia to convey additional musical information, in which gradients in the extent of texturization are utilized to denote variations in the musical information.

Preferrably the section of display board panels each have individual attachment means to permit removal from an overall board and individual placement on a wall, as desired, preferably through equivalent Velcro attachment means.

BRIEF DESCRIPTION OF THE DRAWINGS

FIG. 1 of the drawings is a side perspective view of the overall musical education apparatus showing particularly the display board, the staff and clef indicia means, as well as the musical notation indicia means attached thereto;

FIG. 2 is a side elevational view of one embodiment of the invention in which the staff indicia comprises a plurality of staff lines integrally formed with a plurality of co-planar staff spaces therebetween and in which removable attachment between musical notation indicia and the staff means is accomplished through mated Velcro fastening devices or magnets;

FIG. 3 is a rear elevational view of the back side of a musical notation indicia having formed thereon a substantially circular mated Velcro patch;

FIG. 4 is a side elevational view of the musical notation indicia shown in FIG. 3;

FIG. 5 is a side elevational view of another embodiment of the musical education apparatus in which the staff indicia means comprises a plurality of independently attached staff lines and where attachment is accomplished through Velcro or magnetic devices;

FIG. 6 is a rear elevational view of another embodiment of musical notation indicia in which the attachment means comprises a substantially longitudinal striped Velcro patch along the diameter of the indicia;

FIG. 7 is a side perspective view of an embodiment of musical education apparatus in which either Velcro or magnetic fastening means are utilized to retain the musical notation indicia in place upon the staff indicia, and in which transparent overlay means are utilized;

FIG. 8 is a side perspective view of an embodiment of notation indicia in which duration indicia comprises an integrated stem capable of being extended or retracted for the purpose of denoting differing durations to be associated therewith; and FIG. 9 is a front elevational view of removable hinge apparatus.

DETAILED DESCRIPTION OF THE DRAWINGS

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

The musical education apparatus for displaying musical notation for musical instruction and/or composition is shown in FIG. 1 as apparatus 10. Staff indicia means 14 and 29 corresponding to the treble and bass clefs, respectively, are additionally shown. Staff indicia means 14 includes a plurality of staff lines such as staff line 13 and has affixed thereto, clef indicia means 15 which particularly identifies the treble clef. Musical notation indicia such as indicia 16, 17 and 19 are shown in position on staff indicia 14 in a removably attachable manner. Bass clef indicia means 18 is also shown in FIG. 1 in place upon staff indicia means 29 which is made up of a plurality of staff lines such as staff line 30. Storage tray 11 is positioned at the bottom of display board 12 for the purpose of retaining, storing and organizing the accumulated notation indicia means which are not in use or removably attached to board 12. Also shown in FIG. 1 are overlay covers 70 and 74 which are capable of removable attachment to the display board for positioning over the staff indicia means 14. Cover portion 70 is capable of camouflaging by covering staff 14 with equivalent material to the material on the display board for the purpose of reducing the number of exposed lines. The reduced number of lines assists in the Kodaly method of teaching and additional space "freed up" by the cover 70 can be utilized for rhythm pattern notation and other additional clarifying signs for the student. Yet another "cover" device is shown by way of cover 74 which, instead of blocking off portions of staff indicia 14, actually adds an additional line 75 so that 6 lines are portrayed by the device. Cover portion 74 is affixable through equivalent attachment means such as the Velcro devices previously discussed. Since display board 10 in the preferred embodiment utilizes an all encompassing cover of fabric continuously looped so as to permit "Velcro" attachment at virtually any point along its surface, covers such as covers 70 and 74 can be placed anywhere as desired on display board 10. Cover 74 serves yet another purpose in that by providing line 75, it makes possible conversion of the staff into a representation of the guitar fret network through fret stripping such as strip 73 and through fingering designation number such as fingering instruction number 76.

Several types of teaching theory conversion means are also shown in FIG. 1. Particularly, reference is made to piano keyboard overlay 78 which in this particular embodiment is of a substantially transparent and translucent construction where the "black keys" on a piano keyboard are shown in translucent shading while the white keys are maintained transparent—all for the purpose of viewing the spaces and lines of the staff indicia and actual notation indicia 82 and 83, located thereunder. In another embodiment of the invention, the keyboard overlay is wholly opaque and three-dimensional in the same manner as the actual keyboard of the piano is three-dimensional, to serve as a tactile aid for blind musicians and for clarity for beginning students. In these keyboard overlay embodiments, the position of the keys themselves corresponds to the position of the notation indicia, such as note 80, so that the student may quickly and easily distinguish between a note as it is written in music notation and the corresponding key aligned with it. Further, in the preferred embodiment of the invention, the entire apparatus is of a size capable of cooperating with a piano keyboard overlay 78, which is constructed to exact scale of an actual piano keyboard (with $\frac{7}{8}$ inch white keys and $\frac{1}{2}$ inch black keys). Through this feature, the student is capable of further utilizing his hands for increased tactile significance in the exact manner that the hands would be spaced across an actual piano keyboard, while at the same time seeing the notes associated therewith. Further theory conversion means are shown in FIG. 1 where "Sol-fa" syllables or abbreviations 85 are shown corresponding to do, re, mi, etc. as well as standardized resonant chime bells 79 which are integrated into the overall teaching apparatus to increase its flexibility to a myriad of teaching techniques through the addition of tone production. Attachment means 71 and 72 are shown in FIG. 1 as comprising equivalent types of Velcro attachment means which make capable the facilitated attachment and removal of the entire display board 10 to mated fastening means on a wall in the form of horizontal or vertical standards on that wall.

Board 12 of education apparatus 10 is shown in FIG. 2 in an embodiment where staff indicia means 14 comprises a plurality of staff lines, such as lines 13, 27 and 28, which are integrally formed with a plurality of coplanar staff spaces, such as staff spaces 22, 23, 24 and 25. The present invention contemplates, on one embodiment, removable attachment between the staff indicia means 14 and the board 12 itself so as to assist in the portability and handling of the educational apparatus for its intended purposes. Staff indicia means 29 which corresponds to the bass clef staff is also shown as including lines such as line 32 and staff spaces such as spaces 31a and 31b. Also shown in FIG. 2 is a side view of storage tray 11 attached at the bottom of board 12 where musical notation indicia such as notation indicia 19 with indicia attachment device 20, here comprising a mated Velcro fastener, would be stored when not in use.

FIGS. 3 and 4 show enlarged drawings of musical notation indicia 19 with a substantially circular mated Velcro patch 20 located on its back side 21. In one embodiment of the invention, musical notation indicia 19 itself would be formed of a substantially plastic material so as to resemble a chip while in other embodiments it is contemplated that indicia 19 would be formed of soft, felt-like material. In either of these embodiments, however, it is important that a material be used which provides adequate thickness and be manipulative to manifest a tangible "tactile association" with "notes" and other musical notation. In one of these embodiments, the material for the "chip" is substantially transparent to permit viewing of staff lines or other notation behind it. Alternatively, signs and symbol notation can be mounted on transparent plastic.

Another embodiment of staff indicia means is shown in FIG. 5 wherein apparatus 33 has its staff indicia means compromising a plurality of staff lines such as lines 34 through 38 which are independently attached to the display board of apparatus 33. It should be noted that in both FIGS. 2 and 5, regardless of the type of staff indicia means utilized, the the indicia attachment means can comprise either Velcro or magnetic attachment devices or, for that matter, equivalent attachment or fastening devices which make capable the firmly restrained, though removable, attachment of the musical notation to the staff indicia.

In FIG. 6, a second embodiment of musical notation indicia means is shown in which notation indicia 39 has, on its back side 40, a substantially longitudinal striped Velcro patch 41 which is capable of fastening with the mated Velcro elements on a staff indicia means on a display board. The striped patch 41 extends, substantially, the diameter of the indicia so as to be capable of extending between proximate staff lines in the staff indicia to in turn be securely fastenable between such lines or on such lines.

In a preferred embodiment of the invention, transparent overlay sheets such as sheets 52, 55 and 56 are included so as to be capable of being drawn over the exposed side of display board 46 as shown in FIG. 7. The transparent overlays have supplementary notation indicia such as indicia 53 and 54 thereon so as to be capable of displaying this additional musical notation in alignment in the staff indicia means on display board 46 when positioned over the display board. Accordingly, supplementary indicia 53 and 54 could, by way of example, combine in visual perception with indicia 43 on staff 47 to show the creation, sequentially, of a chord. Also shown in apparatus 42 of FIG. 7 are hinges 44 and 45 which are positioned at desired locations parallel to the vertical axis of apparatus 42 to facilitate the portability and transportation of the overall apparatus.

Also shown in FIG. 7 are texturized staff indicia line 82 and notation indicia member 81 which permit conveyance of duration, speed or strength information to a blind pupil not capable of acknowledging the color or the shape of such indicia. Furthermore, Kodaly handfinger configuration 86 may be utilized to make capable utilization of the overall display board apparatus in association with yet other teaching techniques, such as the Kodaly musical teaching technique. It should be noted that various gradients of texture may be utilized on such things as staff indicia line 82 and notation indicia 81 so as to permit distinguishing by the handicapped or blind pupil of notes or instructions that are to be treated differently.

In one embodiment of the invention, the entire display apparatus 10 is of such a size as to be capable of placement upon and support by a piano rack, the supporting fixture which supports written music notation, usually in the form of books, for the piano player.

In FIG. 8, one of the embodiments of duration indicia is shown in which musical notation indicia 48 has, either a particular color on its face 51 to designate length of duration of musical recognition or, in another embodiment, utilizes a retractable stem 49 which can be extended to appear or retract to disappear, for denoting changes in duration to be accorded the note 48. Additionally, flags such as flag 50 on stem 49 may be utilized to further change the duration accorded the note 48 when stem 49 is in its extended position.

In FIG. 9, a quickly removable hinge arrangement is shown wherein one board would have a female cylindrical element while the board to be juxtaposed next to it would have a male element 87 capable of insertion into and swiveling within female section 88. Through such a manner the board having male attachment means 87 could be quickly removed from the board section having female portion 88 by simply lifting upwardly so as to withdraw, without any additional effort, portion 87 from hinge portion 88. Additionally, in the preferred embodiment of the invention, each of the display board panel sections has its own independent attachment means fabricated onto its reverse side for attachment as desired in sets or individually along the previously mentioned vertical or horizontal wall standards.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

For example, it is well within the scope of the invention to utilize a piano keyboard overlay that is both substantially transparent *and* three-dimensional. The panel apparatus, besides being portable and mountable on a wall, provides a display surface which may be self-supported on a stand for use on a table, or held manually, while simultaneously possessing mounting means for alternative attachment to a wall. Multiple panel usage may also be accomplished without hinges, with the separate panels held abutting one-another independently in alignment, on a mated standard. Additionally, it is contemplated that surface mounted articles to the panel, such as the covers and keyboard overlay, are of such a material or possess yet further Velcro fastening devices to accomodate yet further attachment onto these articles in a layered fashion. Similarly additional overlays may be placed on the guitar fret model to disclose placement of fingers, etc..

What is claimed is:

1. A musical education apparatus for displaying musical notation for purposes of musical instruction and composition, said apparatus comprising:

display board means including a substantially flat planar display board having at least one side exposed to a user;

staff indicia means restrainably attached at its first side to said substantially flat display board;

staff indicia means having indicia attachment means on its second side, opposite to said first side, for the removable attachment of musical notation indicia means thereon;

clef indicia means operably attached to said staff indicia means and which cooperates with said staff indicia means to denote the particular clef of said staff;

said notation indicia means comprising a plurality of musical notation indicia having a front side and a back side thereto;

said back side of said musical notation indicia means having indicia attachment means which cooperate with the indicia attachment means on the second side of said staff indicia means to permit said removable attachment of said notation indicia means to said staff indicia means at any position atop said staff indicia means;

said notation indicia means having duration indicia associated therewith to denote the particular length of time which each of said notation indicia means is to be accorded musical significance;

teaching theory conversion means for converting and enabling said staff indicia means to be used with a variety of alternative musical education training devices;

said teaching theory conversion means having conversion attachment means operably associated therewith so as to enable the operable removable attachment of said teaching theory conversion means atop one or more of said display board means, said staff indicia means, said notation indica means and other said theory conversion means in any position relative thereto, respectively, for unrestricted positionable display thereupon;

said teaching theory conversion means enabling the aligned superimposing of said notation indicia means with said teaching conversion means to, in turn, enable said notation indicia means, said staff indicia means and said theory conversion means to be simultaneously visible to a user while in said superimposed alignment;

said indicia attachment means on said notation indicia means and said theory conversion attachment means on said theory conversion means enabling the superimposed aligned display of at least one said theory conversion means in a first layer position, with at least two or more other ones of said theory conversion means and notation indicia means in at least a second and third respective layer position, to in turn provide a three layered superimposed simultaneous display capability among said three or more layers of said notation indicia and theory conversion means respectively positioned atop one or more of said display board and said staff indicia means, and said staff indicia means and said notation indicia means being proportioned in size to accommodate and operably display said musical instruction and composition with proportioned theory conversion means including proportioned sized piano keyboard display segments, proportioned chime bells and proportioned hand signal members, in either a horizontal, vertical or oblique configuration.

2. The musical education apparatus of claim 1 in which the invention further comprises removable storage tray means for the retention, storage and organized accumulation of said musical notation indicia means while said notation indicia means are removably separated from said display board means, said storage tray means utilizing tray attachment means to accommodate removable affixation to said apparatus.

3. The musical education apparatus according to claim 1 in which the invention further comprises substantially transparent overlay means capable of being drawn over the exposed side of said display board means, said transparent overlay means having means for accepting supplementary notation indicia means so as to be capable of displaying additional musical notation in alignment with the staff indicia means on said display board when positioned over said exposed side of said display board means;

said transparent overlay means thereby permitting sequential construction and display of said supplementary musical notation indicia means in combination with said indicia means on said display board means.

4. The invention according to claim 1 in which said clef indicia means is removably attachable to said staff indicia means which in turn is attached to said display board means.

5. The invention according to claim 1 in which said staff indicia means includes a plurality of staff lines integrally formed with a plurality of co-planar staff spaces therebetween, said plurality of staff lines and spaces having as indicia attachment means on their second sides Velcro fastening material, said indicia attachment means on the back side of said notation indicia means comprising mated Velcro fastening material positioned to permit removable attachment of said notation indicia means to said staff indicia means as desired.

6. The invention according to claim 1 in which said staff indicia means comprises a plurality of staff lines independently fabricated for independent attachment to said display board.

7. The invention according to claim 1 wherein said indicia attachment means on both said second side of said staff indicia means and the back side of said notation indicia comprises mated Velcro fastening devices, said attachment means on the back side of said musical notation indicia means further formed as a substantially circular mated Velcro patch capable of fastening with mated Velcro elements on the second side of said staff indicia means on said display board means.

8. The invention according to claim 1 wherein said indicia attachment means on both said second side of said staff indicia means and the back side of said notation indicia comprises mated Velcro fastening devices, said attachment means on the back side of said musical notation indicia means further formed as a substantially longitudinal striped Velcro patch capable of fastening with mated Velcro elements on said second side of said staff indicia means on said display board means;

said striped longitudinal patch extending substantially, the diameter of said musical notation indicia so as to be capable of extending between proximate staff lines in said staff indicia means.

9. The invention according to claim 1 wherein said duration indicia comprises a plurality of colors respectively assigned to each of said plurality of musical notation indicia means, each color thereby being capable of distinguishing the length of musical duration from other different colors.

10. The invention according to claim 1 in which said display board means has attachment means on the reverse side thereof to permit removable yet secure attachment to cooperating attachment means on wall standards.

11. The musical education apparatus according to claim 1 wherein said display board means is further hinged at desired locations parallel to its vertical axis, for the purpose of facilitating portability and transportation of said overall musical education apparatus.

12. The invention according to claim 1 in which said board means comprises a substantially foam-cored material substantially covered with a continuous looped fabric having said staff indicia integrally fabricated thereon as raised, textured, lines, said continuous looped fabric cooperating with attachment means on said notation indicia to permit attachment of said indicia means at any position thereon.

13. The invention according to claim 1 in which said staff modification means comprises staff cover means, said staff cover means having attachment means to attach to said display board means while simultaneously covering desired portions of said staff indicia means to alternatively add and subtract musical information thereto.

14. The invention according to claim 1 in which said teaching theory conversion means comprises a plurality of Sol-fa syllables capable of removable attachment to said staff indicia means for alternative cooperation with and substitution for said notation indicia means.

15. The invention according to claim 1 in which said teaching theory conversion means comprises keyboard overlay means having attachment means thereto for removable attachment to said staff indicia means and having a key size configuration for appropriate respective alignment with identifying notation indicia on said staff indicia means.

16. The invention according to claim 15 in which said keyboard overlay means is constructed of a substantially transparent material so as to enable said viewing of said notation indicia means therebelow when positioned on said staff indicia means and including substantially translucent portions for denotation of the black keys on a piano keyboard, said keys on said piano keyboard overlay corresponding in substantially equivalent size to the white and black key configuration on an actual piano in which white keys are ⅞ of an inch in width and black keys are ½ of an inch in width, said display board apparatus with said staff indicia and said notation indicia all being of an appropriate size as to permit key to key alignment of notation indicia for respective correspondingly alignment with said keys in said keyboard overlay means.

17. The invention according to claim 15 in which said keyboard overlay means comprises a three dimensional opaque piano keyboard simulation to serve as a tactile aid for blind musicians and for clarity of tactile feel and sense for beginning music students.

18. The invention according to claim 1 in which said teaching theory conversion means comprises a plurality of detachable, mountable standard resonator chime bells, said display board means, staff indicia means and notation indicia means being of such a size to accommodate the 1¼ inch width of said standard resonator chime bells in cooperation with attachment means on said bells to afford removable yet restrained affixation thereof while permitting the sound emitting resonator chime bells to be utilized alternatively with and in substitution for said notation indicia means on said staff indicia means.

19. The invention according to claim 1 in which said teaching theory conversion means comprises a plurality of Kodaly hand signal members capable of removable attachment to said staff indicia means for alternative cooperation with and substitution for said notation indicia means, all proportioned to spaces in said staff indicia means.

20. The invention according to claim 1 in which one or more of said staff indicia and said notation indicia has a textured surface thereon to further convey information relative to said staff and notation indicia means to blind persons.

21. The invention according to claim 20 in which various gradients of said textured material are utilized on one or more of said staff indicia and notation indicia means so as to represent variations in said information on said staff and notation indicia.

22. A musical education apparatus for displaying musical notation for purposes of musical instruction and composition, said apparatus comprising:

display board means including a substantially flat planar display board having at least one side exposed to a user;

staff indicia means restrainably attached at its first side to said substantially flat display board;

staff indicia means having indicia attachment means on its second side, opposite to said first side, for the removable attachment of musical notation indicia means thereon;

clef indicia means operably attached to said staff indicia means and which cooperates with said staff indicia means to denote the particular clef on said staff;

said notation indicia means comprising a plurality of musical notation indicia having a front side and a back side thereto;

said back side of said musical notation indicia means having indicia attachment means which cooperate with the indicia attachment means on the second side of said staff indicia means to permit said removable attachment of said notation indicia means to said staff indicia means as desired;

said notation indicia means having duration indicia associated therewith to denote the particular length of time which each of said notation indicia means is to be accorded musical significance;

said duration indicia means comprising integrated stem means in one or more of said musical notation indicia means, said stem means being extendible between an extended and retracted position so as to appear or not appear respectively for the purpose of changing, in a facilitated manner, the duration means associated with said musical notation indicia means;

staff modification means for modifying said staff indicia means as desired; and teaching theory conversion means for converting and enabling said staff indicia means to be used with a variety of alternative musical education training device.

23. A musical education apparatus for displaying musical notation for purposes of musical instruction and composition, said apparatus comprising:

display board means including a substantially flat planar display board having at least one side exposed to a user;

staff indicia means restrainably attached at its first side to said substantially flat display board;

staff indicia means having indicia attachment means on its second side, opposite to said first side, for the removable attachment of musical notation indicia means thereon;

clef indicia means operably attached to said staff indicia means and which cooperates with said staff indicia means to denote the particular clef of said staff;

said notation indicia means comprising a plurality of musical notation indicia having a front side and a back side thereto;

said back side of said musical notation indicia means having indicia attachment means which cooperate wtih the indicia attachment means on the second side of said staff indicia means to permit said removable attachment of said notation indicia means to said staff indicia means as desired;

said notation indicia means having duration indicia associated therewith to denote the particular length of time which each of said notation indicia means is to be accorded musical significance;

staff modification means for modifying said staff indicia means as desired;

said staff modification means comprising staff cover means, said staff cover means having attachment means to attach to said display board means while simultaneously covering desired portions of said staff indicia means to alternatively add and substract musical information thereto;

said staff cover means including additional line members for converting said staff indicia into a guitar fret indicia means, said staff modification means further including removable guitar fret stripping having attachment means thereon for removable attachment over said staff cover means and said staff indicia means, to portray a fret arrangement common to guitar instruments; and teaching theory conversion means for converting and enabling said staff indicia means to be used with a variety of alternative musical education training devices.

* * * * *